United States Patent
Kimura

(10) Patent No.: US 8,770,640 B2
(45) Date of Patent: Jul. 8, 2014

(54) ROBOT HAND

(71) Applicant: Disco Corporation, Tokyo (JP)

(72) Inventor: Yasutomo Kimura, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 13/798,850

(22) Filed: Mar. 13, 2013

(65) Prior Publication Data

US 2013/0249225 A1   Sep. 26, 2013

(30) Foreign Application Priority Data

Mar. 26, 2012 (JP) ................... 2012-069094

(51) Int. Cl.
*B25J 15/00* (2006.01)
*B25J 19/02* (2006.01)
*B65G 1/06* (2006.01)

(52) U.S. Cl.
USPC ............... 294/2; 294/188; 294/213; 414/941; 901/31; 901/40

(58) Field of Classification Search
USPC ............ 294/2, 104, 64.2, 183, 186, 188, 213, 294/907, 103.1; 414/937, 941; 901/31, 39, 901/40
See application file for complete search history.

(56) References Cited

U.S. PATENT DOCUMENTS

| | | | |
|---|---|---|---|
| 4,773,687 A * | 9/1988 | Bush et al. | 414/752.1 |
| 4,900,214 A * | 2/1990 | Ben | 294/103.1 |
| 5,004,399 A * | 4/1991 | Sullivan et al. | 414/729 |
| 5,133,635 A * | 7/1992 | Malin et al. | 414/744.8 |
| 6,116,848 A * | 9/2000 | Thomas et al. | 414/754 |
| 6,256,555 B1 * | 7/2001 | Bacchi et al. | 700/245 |
| 6,454,332 B1 * | 9/2002 | Govzman et al. | 294/185 |
| 6,623,235 B2 * | 9/2003 | Yokota et al. | 414/744.8 |
| 6,638,004 B2 * | 10/2003 | Berger et al. | 414/941 |
| 7,055,875 B2 * | 6/2006 | Bonora et al. | 294/188 |
| 7,104,579 B2 * | 9/2006 | Casarotti et al. | 294/213 |
| 7,547,053 B2 * | 6/2009 | Yoshida et al. | 294/103.1 |
| 7,878,562 B2 * | 2/2011 | Hamano et al. | 294/213 |
| 8,454,068 B2 * | 6/2013 | Hashimoto et al. | 294/103.1 |
| 2005/0006916 A1 * | 1/2005 | Mantz | 294/103.1 |
| 2011/0187140 A1 * | 8/2011 | Hashimoto et al. | 294/103.1 |

FOREIGN PATENT DOCUMENTS

JP   2005-260065   9/2005

* cited by examiner

*Primary Examiner* — Paul T Chin
(74) *Attorney, Agent, or Firm* — Greer Burns & Crain, Ltd

(57) ABSTRACT

A robot hand having a suction holding unit on one face side holds a plate-shaped work by suction. An outer circumferential edge of the plate-shaped work is held, without contact with a surface of the plate-shaped work, by an outer circumference holding unit provided on the other face side. The robot hand can be used to hold the plate-shaped work yet to be worked by the suction holding unit, and to hold the plate-shaped work having been worked by the outer circumference holding unit. This prevents working debris from being deposited on the plate-shaped work yet to be worked and prevents defective working from occurring. In addition, since the plate-shaped work having been worked is held by the outer circumference holding unit, the robot hand does not make contact with surfaces of the worked plate-shaped work, and, accordingly, no contact marks are formed on the surfaces of the work.

2 Claims, 7 Drawing Sheets

ROBOT HAND

BACKGROUND OF THE INVENTION

1. Field of the Invention

The present invention relates to a robot hand which can hold a plate-shaped work on a front face and a back face thereof.

2. Description of the Related Art

In a working system for working a plate-shaped work, conveying-in of the plate-shaped work onto a working table of the system and conveying-out of the plate-shaped work from the working table are conducted, for example, by use of a robot having a robot hand as described in Japanese Patent Laid-open No. 2005-260065. This robot hand is so configured that a wafer can be held and conveyed in the state of being accommodated in a recess formed on one face of a tray section formed in a plate-like shape. Examples of a working system on which a robot hand with such a configuration is mounted include a grinding machine. In the grinding machine, both a plate-shaped work yet to be ground and a plate-shaped work having been worked are conveyed by use of the robot hand.

SUMMARY OF THE INVENTION

However, there is a problem as follows. In the just-mentioned system, the conveyance before working and the conveyance after working are conducted using the same face of the same robot hand. Therefore, when working debris is deposited on the robot hand upon holding of the worked plate-shaped work, the subsequent holding of a plate-shaped work yet to be worked would cause the working debris deposited on the robot hand to be transferred onto the plate-shaped work yet to be worked. The working debris thus deposited on the plate-shaped work yet to be worked may cause defective working.

In addition, even if the worked plate-shaped work is cleaned by use of cleaning means provided on the working system before holding the worked plate-shaped work by the robot hand, the contact of the robot hand with a surface on one side of the plate-shaped work may leave a contact mark on the held surface of the plate-shaped work.

Accordingly, it is an object of the present invention to provide a robot hand which, when used for conveying a plate-shaped work yet to be worked and a plate-shaped work having been worked, ensures that no working debris will be deposited on the plate-shaped work yet to be worked and that no contact mark will be left on a surface of the plate-shaped work having been worked.

In accordance with an aspect of the present invention, there is provided a robot hand for holding a plate-shaped work, including: suction holding means for holding a plate-shaped work on one face side by suction; and outer circumference holding means for holding an outer circumferential edge of a plate-shaped work on the other face side. The outer circumference holding means includes an abutment section adapted to make contact with the outer circumferential edge of the plate-shaped work, a pressing unit having moving means disposed at a position opposite to the abutment section and adapted to move a pressing member toward and away from the abutment section, and a tentative receiving section disposed between the abutment section and the pressing unit and adapted to tentatively receive an outer circumferential portion of the plate-shaped work. The pressing member is moved toward the abutment section by the moving means, whereby the plate-shaped work tentatively received by the tentative receiving section is moved toward the abutment section, and the outer circumferential edge of the plate-shaped work is clamped and held by the abutment section and the pressing unit.

The robot hand according to the aspect of the present invention is thus configured so that the suction holding means provided on one face side holds the plate-shaped work by suction, whereas the outer circumference holding means provided on the other face side holds the outer circumferential edge of the plate-shaped work without touching a surface of the plate-shaped work. Therefore, by using the robot hand in a different way for each purpose, for example, holding the plate-shaped work yet to be worked by the suction holding means and holding the worked plate-shaped work by the outer circumference holding means, it is possible to prevent working debris from being deposited on the plate-shaped work yet to be worked, and to prevent defective working from occurring. In addition, since the plate-shaped work having been worked is held by the outer circumference holding means, the robot hand does not touch surfaces of the worked plate-shaped work, and, accordingly, no contact mark is formed on the surfaces of the plate-shaped work.

The above and other objects, features and advantages of the present invention and the manner of realizing them will become more apparent, and the invention itself will best be understood from a study of the following description and appended claim with reference to the attached drawings showing a preferred embodiment of the invention.

DETAILED DESCRIPTION OF THE PREFERRED EMBODIMENT

Figure 1:
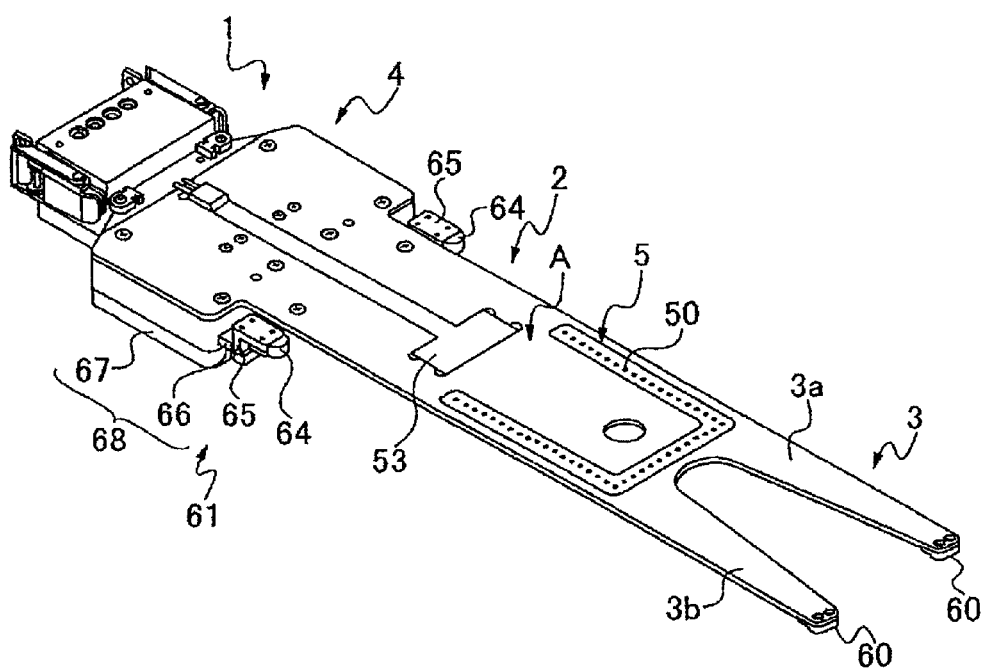
FIG. 1 is a perspective view showing a front face side of a robot hand.
Figure 2:
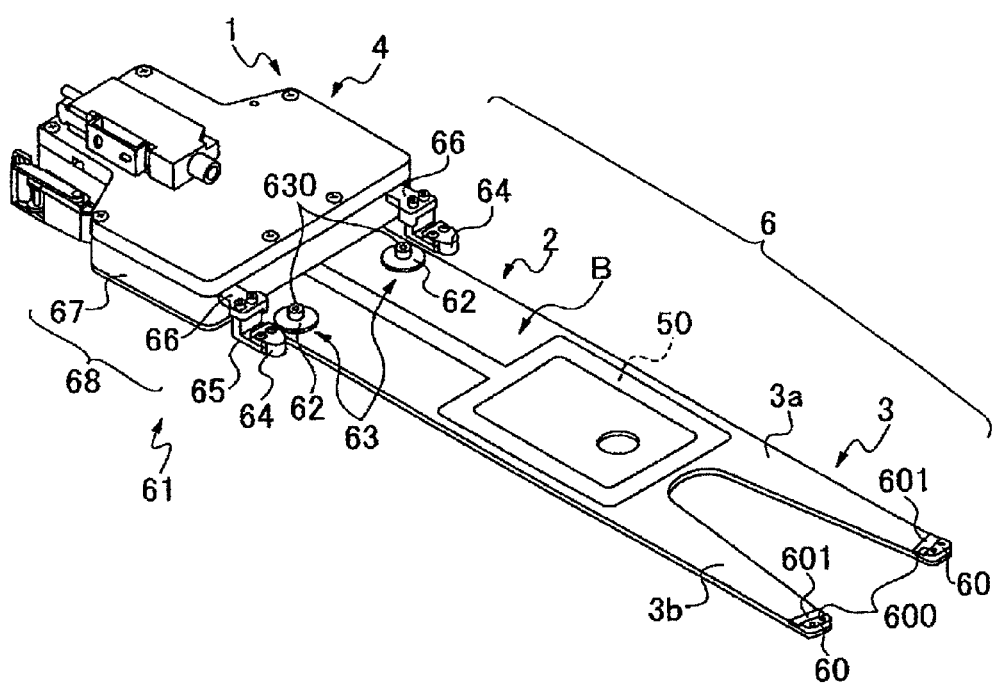
FIG. 2 is a perspective view showing the back face side of the robot hand.

A robot hand 1 shown in FIGS. 1 and 2 includes a flat plate section 2 formed in a plate-like shape, and a fork section 3 having two fingers 3a and 3b bifurcated along a direction from the flat plate section 2 toward the distal end of the robot hand 1. The robot hand 1 has a function of holding a plate-shaped work, both on a front surface A, which is one side, and on a back surface B, which is the other side. The flat plate section 2 is supported, in such a manner that it can be advanced and retracted, by an advance/retraction driving unit 4 which advances and retracts the flat-plate section 2 and the fork section 3 along the longitudinal direction.

Figure 3:
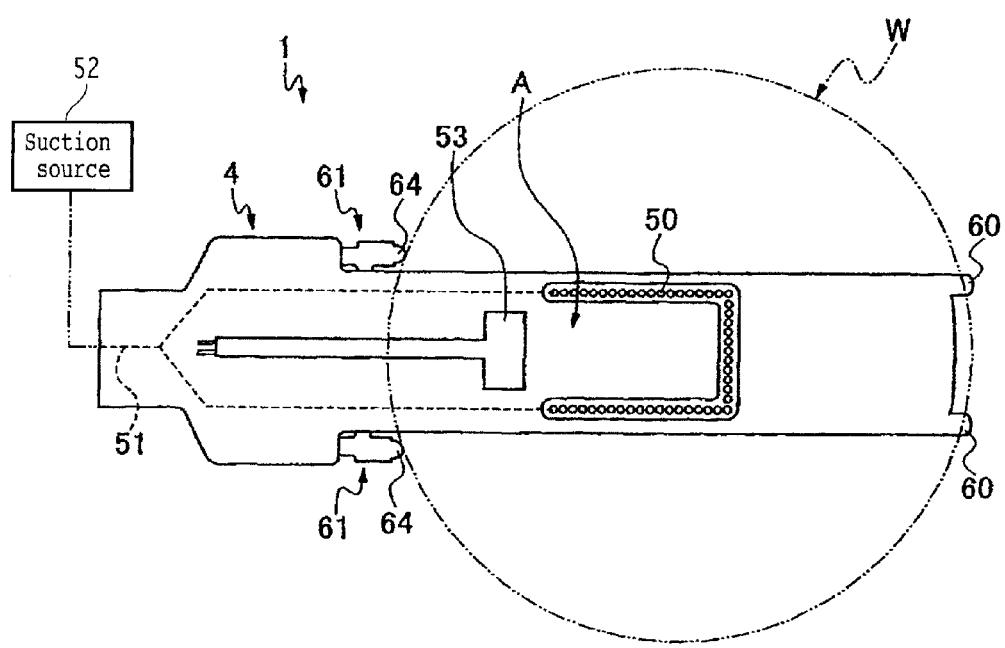
FIG. 3 is a bottom view showing the front face side of the robot hand.

As shown in FIG. 1, suction holding means 5 for holding a plate-shaped work by suction is provided on the front surface A side of the flat plate section 2. The suction holding means 5 includes a suction section 50 provided with a multiplicity of suction holes, a suction passage 51 formed inside the flat plate section 2 and the advance/retraction driving unit 4 as shown in FIG. 3, and an external suction source 52 communicating with the suction passage 51. In addition, a detection unit 53 for detecting the presence or absence of a plate-shaped work to be held is embedded in the flat plate section 2 on the front surface A side. The detection unit 53 is composed, for example, of an electrostatic sensor.

As shown in FIG. 2, outer circumference holding means 6 for holding an outer circumferential edge of a plate-shaped work is provided on the back surface B. The outer circumference holding means 6 includes abutment sections 60 which are formed at the distal ends on the back surface B side of the fingers 3a and 3b and brought into contact with the outer circumferential edge of the plate-shaped work, a pressing unit 61 which is located at a position opposite to the abutment sections 60 and presses the plate-shaped work toward the abutment sections 60, and tentative receiving sections 601 and 62 which are disposed between the abutment sections 60 and the pressing unit 61 and support the plate-shaped work from below.

The abutment sections 60 are formed to project from the back surface B in the thickness direction of the fingers 3a and 3b, and are formed in conformity with the outer circumferential shape of the plate-shaped work to be mounted on the flat plate section 2 and the fork section 3. In the embodiment shown in FIG. 2, a side surface 600 of an abutment section 60 is formed in a shape corresponding to an arc of the outer circumference of a circular plate-shaped work.

Figure 4:
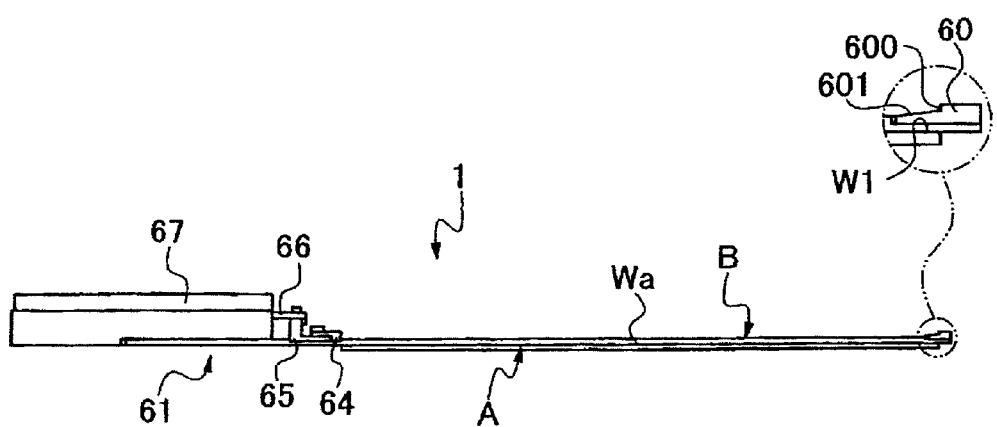
FIG. 4 is a front view showing a condition where a plate-shaped work is held by suction on the front face side of the robot hand.

As shown in an enlarged form in FIG. 4, the side surface 600 of the abutment section 60 is erected substantially vertically. In addition, on the side closer to the pressing unit 61 than the abutment section 60, there is formed a tentative receiving section 601 composed of a gently inclined surface which slopes down from the lower end of the side surface 600 toward the flat plate section 2 side.

As shown in FIG. 2, on the back surface B of the flat plate section 2, two guide members 63 are provided at positions which are between the abutment sections 60 and the pressing unit 61 and which are nearer to the advance/retraction driving unit 4 than the center of the plate-shaped work, or the object to be held. Each of the guide members 63 is provided in a central area thereof with a projection 630 formed in a cylindrical shape. The projection 630 is formed on the radially outer side thereof with a tentative receiving section 62 composed of an inclined surface which gently slopes down radially outward from the base of the projection 630. Incidentally, while two guide members 63 are provided in the embodiment shown, the guide members 63 may be provided in the number of three or more.

Besides, only one guide member 63 may be provided. In the embodiment shown, there are provided a total of four tentative receiving sections, consisting of the two tentative receiving sections 601 and the two tentative receiving sections 62, thereby holding a plate-shaped work W before positioning. However, other configurations may also be adopted, for example, a configuration in which the plate-shaped work W is supported by at least three tentative receiving sections, which may consist of two tentative receiving sections 601 and one tentative receiving section 62, or may consist of one tentative receiving section 601 and two tentative receiving sections 62. Furthermore, each of the tentative receiving sections may be formed in a shape along the outer circumferential shape of the plate-shaped work. For example, in the case of a circular plate-shaped work as shown in the drawings, each tentative receiving section may be formed in a shape along an arc of the outer circumference of the work.

As shown in FIGS. 2 and 4, on the back surface B of the flat plate section 2, a pair of pressing members 64 are provided at positions opposed to the abutment sections 60 in the longitudinal direction. A pressing member 64 is connected to a piston 66 through a connecting member 65. The piston 66 is so supported that it can be advanced and retracted, by a cylinder 67. When the pistons 66 are advanced or retracted, the pressing members 64 can also be advanced or retracted accordingly. The cylinders 67 and the pistons 66 function as moving means 68 for advancing and retracting the pressing members 64 in relation to the abutment sections 60. In addition, the pressing members 64, connecting members 65, and moving means 68 make up the pressing unit 61.

In the case of holding the plate-shaped work W on the front surface A of the robot hand 1, the front surface A faced down is pressed against an upper surface Wa of the plate-shaped work W, as shown in FIGS. 3 and 4, and a suction force is exerted at the suction section 50 so that the plate-shaped work W is suction held by the suction holding means 5. Then, in this condition, the robot hand 1 is raised, whereby the plate-shaped work W can be conveyed.

Figure 5:
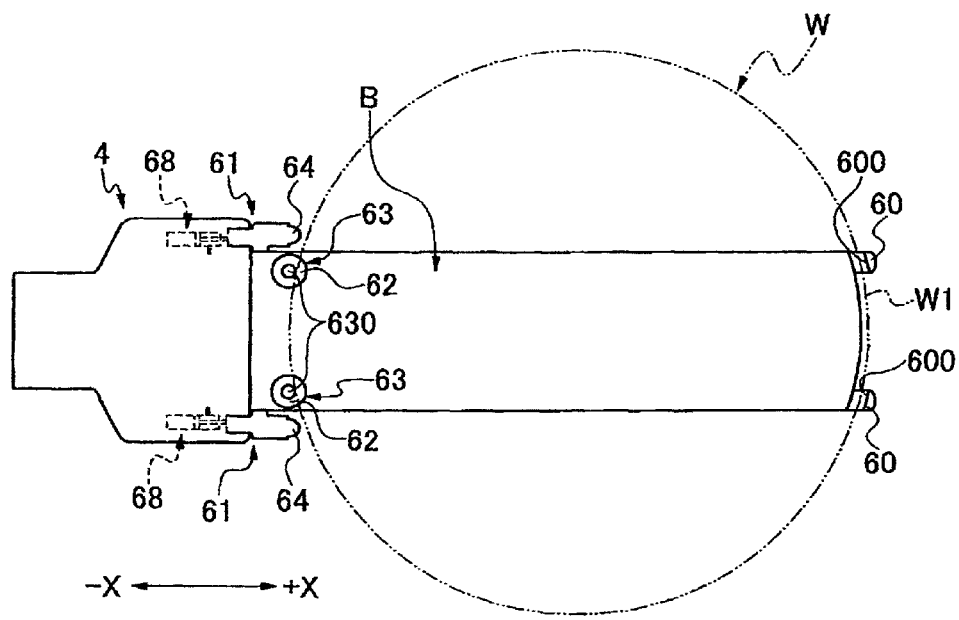
FIG. 5 is a plan view showing a condition where a plate-shaped work is tentatively received on the back face side of the robot hand.

On the other hand, in the case of holding the plate-shaped work W on the back surface B of the robot hand 1, the moving means 68 withdraw the pressing members 64 toward the advance/retraction driving unit 4 side (in a direction of arrow −X), as shown in FIG. 5, and, in this condition, press the plate-shaped work W against the back surface B. In this instance, it is ensured that an outer circumferential edge W1 of the plate-shaped work W is located on the side nearer to the pressing unit 61 than the abutment sections 60 so that the outer circumferential edge W1 does not make contact with the side surfaces 600 of the abutment sections 60.

Figure 6:
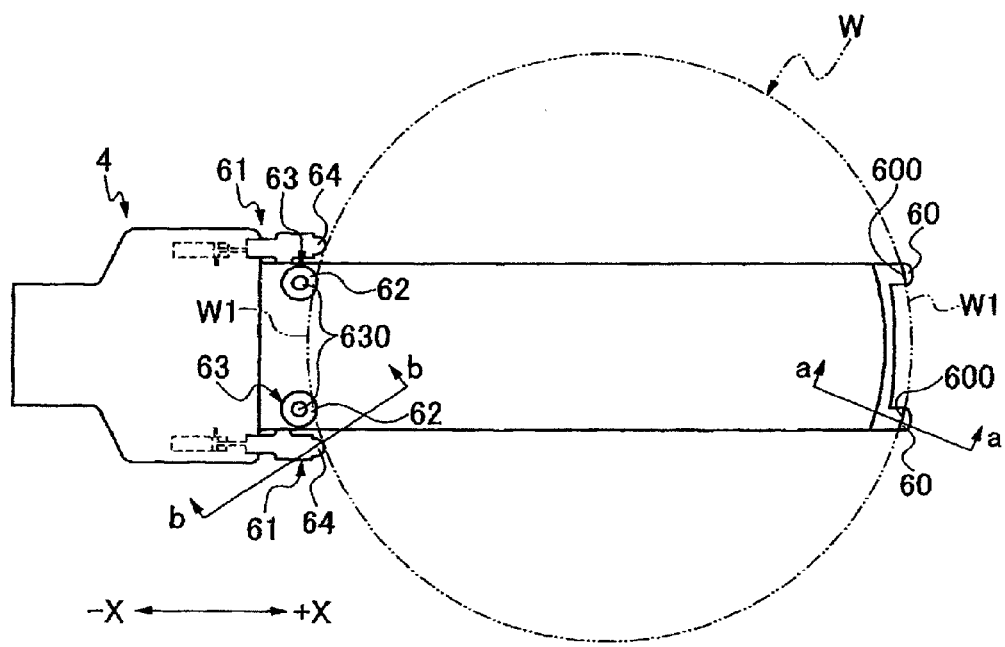
FIG. 6 is a plan view showing a condition where a plate-shaped work is clamped and held on the back face side of the robot hand.

Next, the moving means 68 advance the pressing members 64 toward the side of the abutment sections 60 (in a direction of arrow +X), whereby the pressing members 64 are brought into contact with the outer circumferential edge W1 of the plate-shaped work W, as shown in FIG. 6. Further, the pressing members 64 are moved in the +X direction, whereby the plate-shaped work W is moved progressively in the +X direction. As a result, as shown in FIG. 6, the outer circumferential edge W1 of the plate-shaped work W comes into contact with the side surfaces 600 of the abutment sections 60, and the plate-shaped work W is clamped and held between the abutment sections 60 and the pressing members 64.

Figure 7:
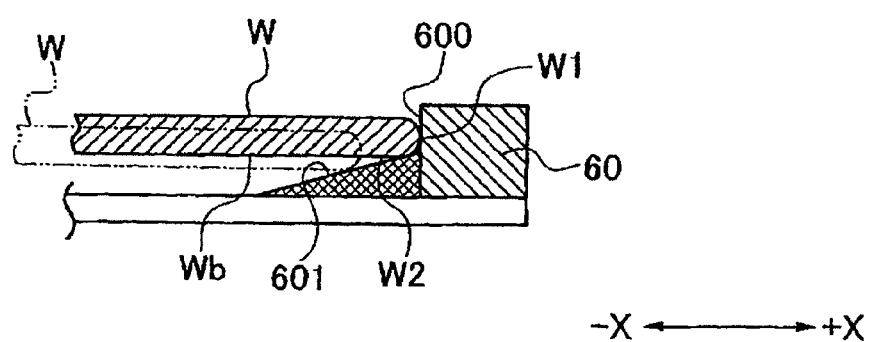
FIG. 7 is a sectional view taken along line a-a of FIG. 6.

The process in which the plate-shaped work W is moved in the +X direction by being pressed by the moving means 68 is conducted as shown in FIG. 7. In this process, on the side of the abutment sections 60, an outer circumferential portion W2 of the plate-shaped work W tentatively received by the tentative receiving sections 601 is gradually moved upward while being guided by the tentative receiving sections 601, and this movement is stopped when the outer circumferential edge W1 of the plate-shaped work W is abutted on the abutment sections 60. Incidentally, the term "tentative receiving" means a state in which the plate-shaped work W is supported in a tentative position before being positioned finally.

Figure 8:
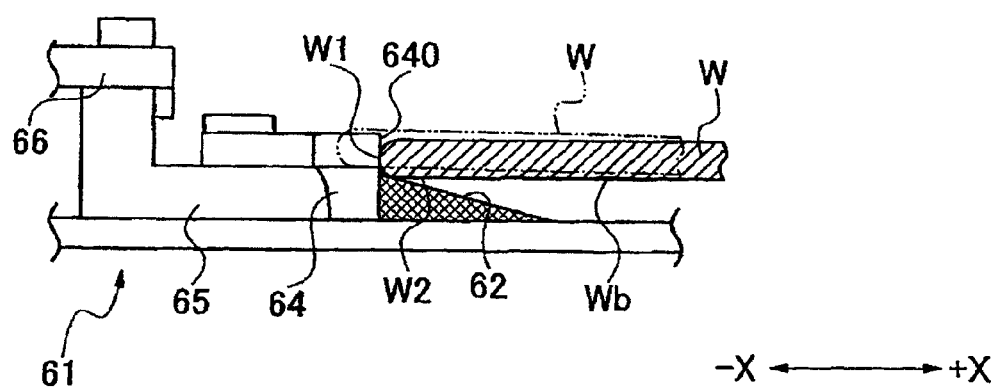
FIG. 8 is a sectional view taken along line b-b of FIG. 6.

In addition, the process in which the plate-shaped work W is moved in the +X direction is conducted as shown in FIG. 8. As shown, on the side of the pressing members 64, the plate-shaped work W is pressed in the +X direction with its outer circumferential edge W1 making contact with side surfaces 640 of the pressing members 64, whereby the outer circumferential portion W2 of the plate-shaped work W tentatively received by the tentative receiving sections 62 is moved downward while being guided by the tentative receiving sections 62. Then, this movement is stopped when the outer circumferential edge W1 of the plate-shaped work W is abutted on the abutment sections 60, as shown in FIG. 7. When the movement of the plate-shaped work W is stopped, the outer circumferential edge W1 of the plate-shaped work W is clamped by the abutment sections 60 and the pressing unit 61.

Thus, the outer circumferential portion W2 of the plate-shaped work W is supported by the tentative receiving sections 601 and 62, and the outer circumferential edge W1 is supported from both ends. On the central side relative to the outer circumferential portion W2, surfaces of the plate-shaped work W do not make contact with any component part. When the plate-shaped work W is conveyed in such a held state, therefore, no contact mark will be formed on the surfaces of the plate-shaped work W. For example, in a case where the plate-shaped work W is a semiconductor wafer and the outer circumferential portion W2 is a surplus region in which no device is formed, devices can be prevented from being damaged.

Besides, in the robot hand 1, it is ensured that on one surface side, the plate-shaped work can be suction held by the suction holding means 5, and, on the other surface side, the outer circumferential edge of the plate-shaped work can be held by the outer circumference holding means 6. Therefore, by using the robot hand 1 in a different way for each purpose, for example, holding a to-be-worked plate-shaped work with no working debris deposited thereon by the suction holding means 5 and holding a worked plate-shaped work with working debris deposited thereon by the outer circumference holding means 6, it is possible to prevent working debris from being deposited on a to-be-worked plate-shaped work, and to prevent defective working from occurring.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A robot hand for holding a plate-shaped work, comprising:
    suction holding means for holding a plate-shaped-shaped work on one face side of the robot hand by suction; and
    outer circumference holding means for holding an outer circumferential edge of a plate-shaped work on an other face side of the robot hand,
    wherein the outer circumference holding means includes an abutment section adapted to make contact with the outer circumferential edge of the plate-shaped work, a pressing unit having moving means disposed at a position opposite to the abutment section and adapted to move a pressing member toward and away from the abutment section, and a tentative receiving section disposed between the abutment section and the pressing unit and adapted to tentatively receive an outer circumferential portion of the plate-shaped work, and
    the pressing member is moved toward the abutment section by the moving means, whereby the plate-shaped work tentatively received by the tentative receiving section is moved toward the abutment section, and the outer circumferential edge of the plate-shaped work is clamped and held by the abutment section and the pressing unit.

2. The robot hand according to claim 1, wherein the suction holding means includes a plurality of suction holes configured and arranged to face a planar surface of the plate-shaped work.

* * * * *